S. L. C. COLEMAN.
SHOCK ABSORBING MECHANISM FOR MOTOR VEHICLES.
APPLICATION FILED MAR. 21, 1918.
1,353,029.
Patented Sept. 14, 1920.
4 SHEETS—SHEET 2.
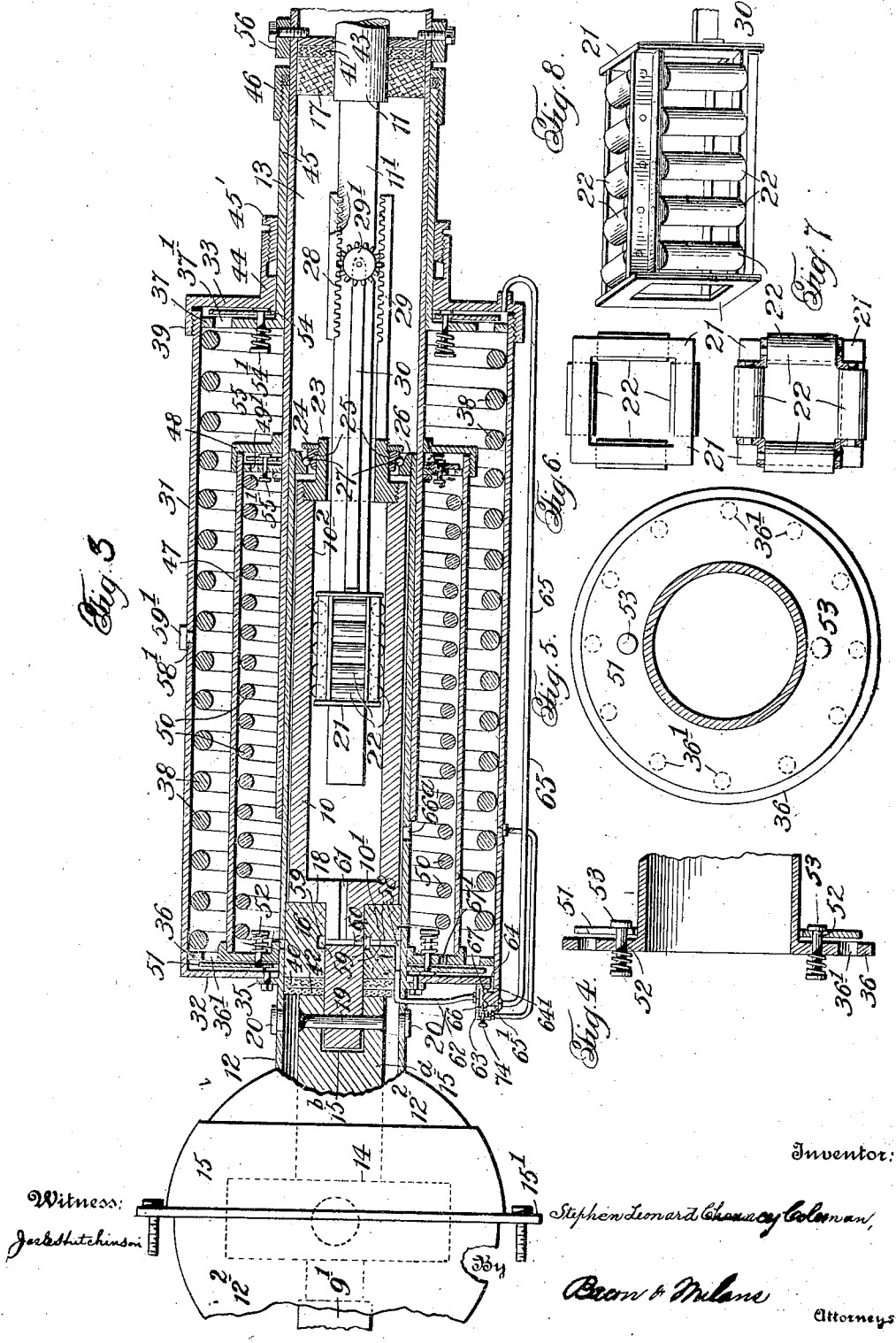
Inventor:
Stephen Leonard Chauncey Coleman,
By
Bacon & Milans
Attorneys S. L. C. COLEMAN.
SHOCK ABSORBING MECHANISM FOR MOTOR VEHICLES.
APPLICATION FILED MAR. 21, 1918.
1,353,029.
Patented Sept. 14, 1920.
4 SHEETS—SHEET 3.
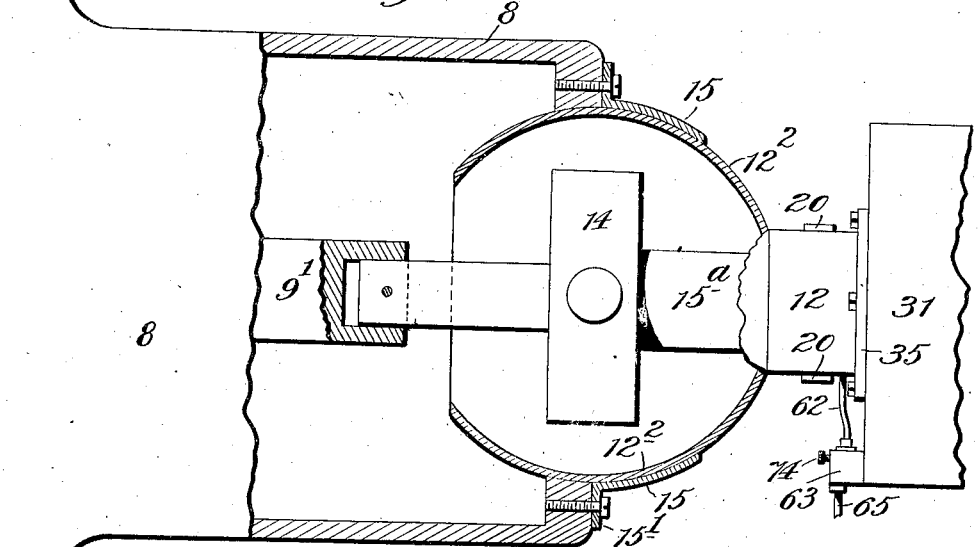
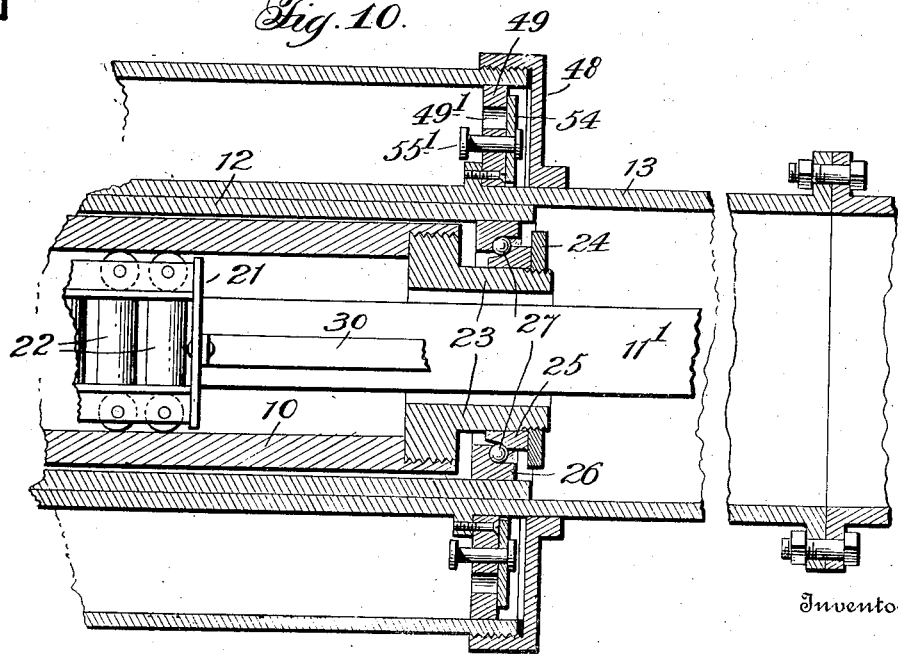
Witness:
Jas E Hutchinson
Inventor:
Stephen Leonard Chauncey Coleman,
By
Bacon & Milans Attorneys

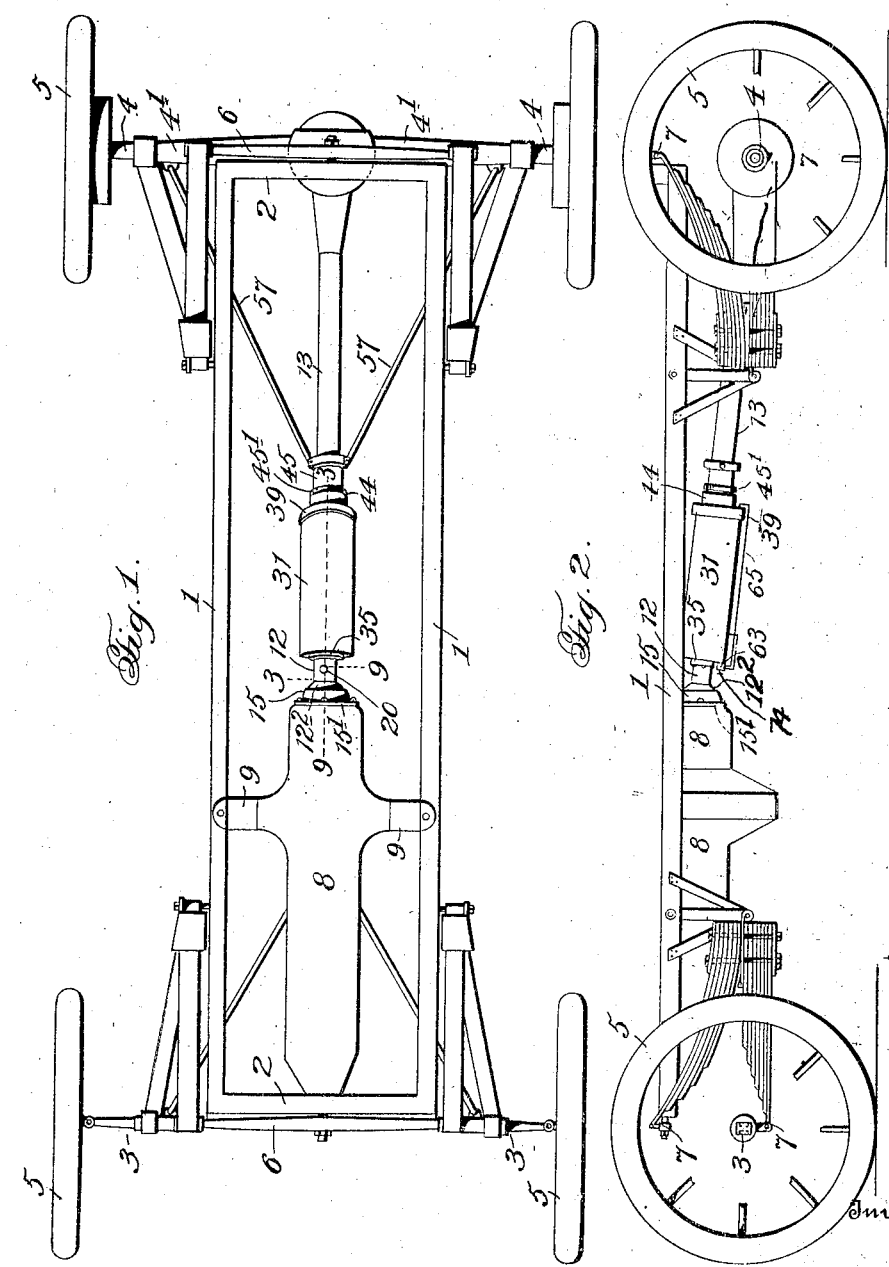

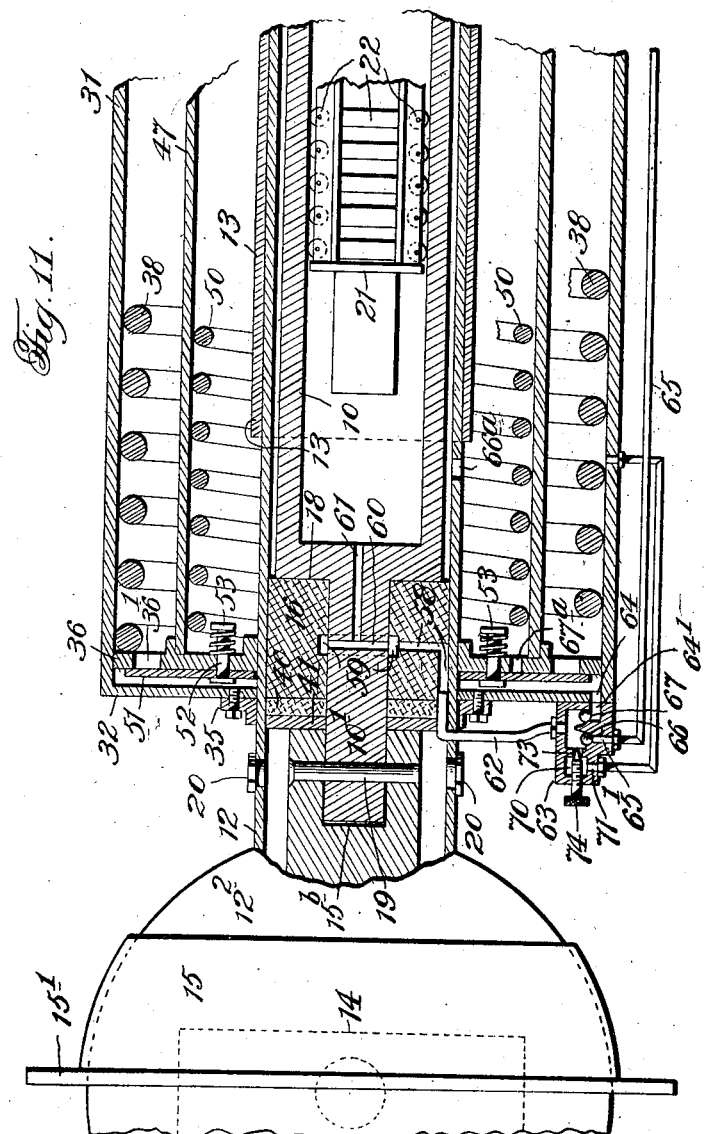

UNITED STATES PATENT OFFICE.

STEPHEN LEONARD CHAUNCEY COLEMAN, OF FREDERICTON, NEW BRUNSWICK, CANADA.

SHOCK-ABSORBING MECHANISM FOR MOTOR-VEHICLES.

1,353,029.	Specification of Letters Patent.	Patented Sept. 14, 1920.

Original application filed September 13, 1916, Serial No. 119,934. Divided and this application filed March 21, 1918. Serial No. 223,818.

*To all whom it may concern:*

Be it known that I, STEPHEN LEONARD CHAUNCEY COLEMAN, a subject of the King of Great Britain, residing at Fredericton, in the county of York, Province of New Brunswick, Dominion of Canada, have invented certain new and useful Improvements in Shock-Absorbing Mechanism for Motor-Vehicles, of which the following is a specification, reference being had therein to the accompanying drawing.

This invention relates to improvements in shock absorbing mechanism for motor vehicles, the subject matter of the present application being a division of an application Serial No. 119,934, filed September 13, 1916.

The object of the invention is to provide improved shock absorbing mechanism for cushioning the axles against longitudinal shocks and preventing or reducing the transmission to the vehicle body of such longitudinal shocks caused by the wheels striking obstructions or ruts in traveling over rough roads.

Another object of the invention is to provide improved shock absorbing means for cushioning and preventing or lessening the strains and shocks incident to the driving mechanism including those due to accelerations or retardations of the vehicle.

A further object of the invention is to provide improved shock absorbing mechanism that will be of compact construction, that can be readily applied to present day types of machines without requiring material change of the forms of the chassis, and located and arranged so as to take up but little space, to be entirely out of the way, and to be protected.

A still further object of the invention is to improve the construction of shock absorbing mechanism of this nature, to provide for more efficient lubrication, the exclusion of dust and dirt therefrom, and greater durability and efficiency in operation.

The invention with other objects and advantages thereof and the particular construction and arrangement of parts comprising the same will be understood from the following detailed description when considered in connection with the accompanying drawings forming part hereof and illustrating one embodiment of the invention.

In the drawings:

Figure 1 is a top plan view of a motor vehicle equipped with shock absorbing mechanism in accordance with the invention.

Fig. 2 is a side elevation.

Fig. 3 is a longitudinal section on the line 3—3 of Fig. 1, the shock absorbing mechanism and the parts directly associated therewith being shown on an enlarged scale.

Figs. 4 and 5 are detail views, on an enlarged scale, of the piston construction.

Figs. 6, 7, and 8 are detail views of the movable anti-friction bearing device for the transmission shaft.

Fig. 9 is a section, on an enlarged scale, on line 9—9 of Fig. 1.

Fig. 10 is a detail sectional view on an enlarged scale of one end portion of the cushioning device and shaft casing.

Fig. 11 is a detail sectional view on an enlarged scale of a portion of the cushioning device showing certain of the conduits for the circulation of lubricant, and the leakage of air from behind the pistons.

The invention comprehends the connection of the driving axle or axles with the frame so as to permit longitudinal movement of the driven axle relative to the frame, and the provision of cushioning means associated with the drive connection between the motor and the driven axle, said driving connection having portions movable longitudinally relatively to each other, the said cushioning means being constructed and arranged to yieldably resist longitudinal movement of said portions of the driving connection relatively to each other, and longitudinal movement of the driven axle relatively to the frame.

In the drawings, the vehicle body supporting frame or chassis is shown as having side bars 1 and end bars 2, 3 designates the front axle, 4 and 4' the rear driving axle and housing, and 5 the wheels. The driven axle housing is connected with the vehicle body supporting frame so that the axle and housing can have movement longitudinally relatively to the vehicle body supporting frame. In the particular construction illustrated in the drawings, the housing of the driven axle is connected to the vehicle supporting frame by springs disposed at opposite sides thereof, each spring consisting of a pair of leaf spring members having their butt ends secured together and pivotally connected to the side bars 1 of the frame, and their outer ends or tips pivotally connected respectively to one end of an equalizer bar 6 and one of the axles, the lower leaf spring members being connected with the axle by shackles 7. 8 designates the engine mounting and housing secured at its front end to one end bar 2 of the frame and having lateral extensions or lugs 9 suitably secured to the side bars 1 of the frame. 9′ designates an inner section of the power transmission shaft supported upon the engine mounting 8.

In accordance with the teachings of the invention the transmission shaft and its housing have telescoping portions or sections 10—11, 12—13, the portion 10 of the transmission shaft having a universal joint connection 14, of any approved form, with the inner section 9′ of the transmission shaft that is mounted on the vehicle supporting frame, and the housing or casing section 12 has a universal joint connection with the engine housing or casing 8, said last mentioned section 12 having a hollow partly spherical part $12^2$ loosely fitting within a correspondingly formed partly spherical shaped hollow head, 15, the latter being shown as a separate part provided with a securing flange 15′ fitting against and suitably secured to the rear end of the engine casing 8. The universal joint connections allow vertical and lateral movement of the driven axle and housing 4—4′ relative to the vehicle supporting frame, and the sectional construction of the transmission shaft and its housing permits longitudinal movement of the rear axle and housing relative to the vehicle supporting frame without interference with the driving connection.

16—17 designate bearings on the housing sections 12—13, for the shaft sections, 10—11. Extending from the universal joint connection 14 there is a short shaft section $15^a$ which is provided with a socket $15^b$ in one end thereof, and the shaft section 10 has a reduced portion 10′ at one end extending through the bearing 16 and fitting within the socket $15^b$ of the shaft section $15^a$, the shouldered portion 18 of the shaft section 10 bearing against one end face of the bearing 16, and the shaft section 10 and shaft section $15^a$ are secured together by a transverse fastening member 19. The housing section 12 is provided with openings to permit the insertion of the fastening member 19, the openings being closed by removable screw plugs 20. The shaft section 10 has a tubular part $10^2$, in which is adapted to work a reduced portion 11′ of the shaft section 11. An anti-friction bearing is provided between the shaft section 10—11. The bearing is of tubular formation and slidably fits within the tubular part $10^2$ of the shaft section 10, and slidably fits over the reduced portion 11′ of the shaft section 11, the tubular part $10^2$ at its interior having angularly related walls, and the tubular anti-friction bearing and the reduced portion 11′ of the shaft section 11 being correspondingly shaped in cross section so that while the parts are free for easy sliding movement, longitudinally upon each other, the two shaft sections 10—11 are coupled to rotate together. The anti-friction bearing is shown as consisting of a substantially rectangular retaining frame or cage 21 in which are journaled rolls 22 arranged in sets at the top, bottom and sides of the frame, the rolls 22 projecting beyond the frame at the inner and outer faces thereof.

A bearing is provided between the outer end of the shaft section 10 and housing section 12, said bearing forming a support for the telescoping shaft sections 10—11 centrally of the bearing 16—17 and acting in conjunction therewith to support and prevent lateral vibration of the shaft sections and housing sections relatively to each other. This bearing comprises a sleeve 23 having a threaded portion at its inner end detachably engaging a threaded portion on the shaft section. Held in position on the sleeve 23 by a nut 24 is a ball race member 25, and 26 is a ball race member carried by the housing section 12, the last mentioned ball retaining or race member 26 having an externally threaded portion detachably engaging a threaded portion on the housing section 12. 27 represents the ball bearings between the race members 25—26.

In order to provide for maintaining the anti-friction bearing between the shaft sections 10—11 in proper working relation to said parts, I provide a gear connection comprising rack bars 28—29 connected to the respective shaft sections 10—11, and a pinion 29′ mounted on the outer end of a rod 30 secured to the frame 21 and meshing with both of the rack bars 28—29, the rack bar 29 being shown attached to the sleeve 23.

The cushioning means is shown as comprising a main outer cylinder 31, which has openings centrally of its end walls or heads 32—33 through which extend the telescoping shaft sections 10—11 and housing sections 12—13. The cylinder 31 is rigidly secured to the housing section 12, by screws or like fastenings which connect the head or end wall 32 of the cylinder to a flange 35 on the housing section. Within the cylinder at opposite ends thereof are annular pistons 36—37, and interposed between the pistons is cushioning means in the form of a coiled compression spring 38. The end or head 33 of the cylinder 31 is removable, said head having a flange 39, which is interiorly threaded and engages a threaded portion of the cylinder. 40—41 designate packing washers of felt or the like located respectively at the outer ends of the bearing 16—17, said packings 40 and 41 being provided at their outer sides with metal facings or washers 42—43. The removable head 33 of the cylinder 31 is provided adjacent its central opening with a tubular extension 44 which has a stuffing box 45' at the outer end and slidably fitting within said tubular extension 44 is a tubular piston rod 45 which is connected with the piston 37. The housing section 13 slidably fits within the annular piston 37 and its tubular piston rod 45, the latter being provided with a stuffing box 46 making a fluid tight joint between these parts. The piston 36 slidably engages the housing section 12 and has secured thereto a cylinder 47, said cylinder being provided with a removable end or head 48 that has a central opening at one end to slidably fit over the housing section 13. 49 designates an annular piston in the cylinder 47 fixed to the housing section 13, and interposed between said piston 49 and the piston 36 is a coiled compression spring 50.

The piston 36 is provided with air ports 36' and with a check valve controlling the ports to permit the passage of air therethrough in one direction. Any suitable form of check valve may be employed for this purpose. The particular construction shown, reference being had particularly to Figs. 4 and 5 of the drawings, comprises an annular plate 51 supported on short rods 52 slidably engaging apertures in the piston. The plate 51 is secured to the rods at the outer ends thereof, and the rods at their inner ends are provided with heads 53 to limit the movement of the rods in one direction. The pistons 37—49 are provided respectively with air ports 37' and 49' and these pistons are equipped with check valves that are similar in construction to the check valves of the piston 36.

54—54', and 55—55' designate respectively the valve plates and supporting rods for the pistons 37 and 49. On the housing section 13 is a fixed abutment or shoulder 56 adapted when the housing section 13 is moved forwardly within the cylinder 31 to engage the stuffing box at the outer end of the tubular piston rod 45 and move said rod and its piston 37 forwardly against the tension of the coiled compression spring 38. 57 designates radius rods connected at one end with the rear axle housing 4' and at their opposite ends secured to the housing section 13.

The operation of the device is as follows: In Fig. 3 of the drawings the parts are shown in normal position. When a shock is received through the housing section 13 it causes said section to move forward within the cylinder 31, and the shoulder or abutment 56 on the housing section 13 is brought into engagement with the stuffing box 46 at the outer end of the tubular piston rod 45, carrying said piston rod 45 and its piston 37 forwardly with it against the gradually increasing resistance of the coiled compression spring 38, at the same time piston 49 on the housing section 13 is moved forwardly against the tension of the spring 50. On this forward movement of the pistons 37 and 49, the check valves of the pistons are forced open by the air pressure and air is permitted to flow to the opposite sides of the pistons. When the shock has subsided or been absorbed by the springs 38 and 50, the pistons are forced back by the springs to their normal positions. On the return stroke of the pistons, the check valves thereof are closed by the air pressure, the pistons being cushioned in their return movement by the air compressed between one side thereof and the end walls or heads of the cylinders. When a shock is received through the housing section 12 moving the same rearwardly, the piston 36 engages the end or head 32 of the cylinder 31 so that the cylinder and piston are carried rearward with the housing section 12 against the gradually increasing resistance of the coiled compression spring 38. When the shock has been overcome by the spring, the piston 36 is forced back to normal position by the spring. Upon the inner movement of the piston 36 its check valve is opened by the air pressure, air flowing through the air ports in the piston to the opposite side thereof. Upon the return stroke of the piston 36 its check valve closes the air ports in the piston, provision being thus made for the cushioning of the piston on its return stroke by the air compressed between the closed side of the piston and the end wall or head 32 of the cylinder.

The auxiliary cylinder 47, spring 50, and piston 49 of the cushioning means is adapted to offset the effect of the thrust of the drive connection so that substantially equal spring resistance is imposed by the spring 38 to longitudinal movement of the rear axle relative to the frame under road shocks in opposite directions.

The cylinder 31 is adapted to be plentifully supplied with lubricating oil through a filling opening 58' that is closed by a screw plug 59', and means is provided for effecting a circulation and thorough distribution of the lubricant to the various working parts and bearings of the mechanism. The bearing 16 is provided with a bore 58 extending through the same from one end thereof to an annular oil groove 59 in the inner face of the bearing. The reduced portion 10' of the shaft section 10 has a transverse bore 60 located opposite the annular oil groove 59, and 61 is a longitudinally extending passage connecting the transverse bore 60 with the interior of the tubular part 10² of the shaft section 10. A short conduit pipe 62 has one end fitted in the outer end of the bore 58. The pipe 62 extends through an opening in the housing section 12 and has its outer end connected with the outlet of a valve casing 63. 64 and 65 designate conduits leading respectively from the opposite ends of the cylinder 31 to inlet passages 64'—65' in the valve casing 63, the passages being controlled by ball check valves 66—67 which permit the flow of lubricant in one direction through the conduits 64—65 to the short conduit pipe 62. Upon each return stroke of the piston 36 and 37, a quantity of oil is forced under pressure from the ends of the cylinder 31 through one of the conduits 64—65, the short pipe 62, the passage 61 to the annular oil groove 58, thence flowing through the transverse bore 60 and the passage 61 to the interior of the tubular part 10² of the shaft 10, a sufficient quantity of the lubricant being supplied to the interior of said tubular portion 10² so that the moving parts within the outer cylinder 31 operate in a bath of oil, oil being also supplied to the bearings 16—17. 66ª designates an opening in the housing section 12 providing a passage for the oil from the interior of said housing section into the smaller cylinder 47, and 67ª is an opening in the piston 36 affording a passage for the lubricant from one end of the cylinder 47 back into the cylinder 31.

The conduits 64—65 leading to the valve casing 63 also serve to some extent to permit leakage of the air trapped behind the pistons 36—37—49 when they have been moved inwardly from the ends of the cylinder. The invention comprehends the provision of other means for this purpose whereby the extent of leakage of air from behind the pistons may be varied at will and graduated to a nicety. The means for this purpose is shown as consisting of a by-pass connection 70 connected with the cylinder 31 intermediate the ends thereof and leading from the interior of said cylinder to an inlet port 71 located at one end of the valve casing 63. The valve casing has a passage 72 leading from said port to the valve chamber, said passage terminating in a valve seat 73. 74 is an adjustable needle valve adapted to coöperate with said valve seat 73.

It will be observed that the invention provides for the cushioning of shocks incident to the driving mechanism including the driving thrust, vibration due to variations in the velocity of the driving shaft caused by the angle between the crank shaft and driving shaft, accelerations and retardations of the vehicle, etc., as well as road shocks. The construction is of a very simple, compact, durable nature, is located and arranged so as to be out of the way, can be employed without material change to the design of chassis commonly employed, provision is made for the thorough lubrication of the various bearings and working parts of the mechanism and the protection of the same against the entrance of dust or sand thereto, and a very durable and efficient construction is afforded.

I desire it to be understood that while I have illustrated in the drawings a specific form or embodiment of the invention that changes in and variations of the particular construction shown, as will appeal to those skilled in the art and falling within the scope of the appended claims may be made without departing from the spirit of the invention.

What I claim is:

1. In a motor vehicle, the combination of a frame, axles therefor, a motor on the frame, a longitudinally adjustable drive connection between the motor and one of the axles, a casing for said drive connection, said casing being connected with the frame and with the driven axle and having intermediate telescoping portions, and cushioning means associated with said casing yieldably resisting movement of said portions of the casing relatively to each other.

2. In a motor vehicle, the combination of a frame, axles therefor, power mechanism on the frame, a drive connection between the power mechanism and one of the axles including a longitudinally extending transmission shaft having slidably related portions, a casing for the transmission shaft connected with the frame and with the driven axle and having slidably related portions, and cushioning means connected with the said casing and yieldably resisting longitudinal movement of the slidably related portions of the casing relatively to each other.

3. In a motor vehicle, the combination of a frame, axles therefor, a motor on the frame, a longitudinally extending adjustable drive connection between the motor and one of the axles, a casing for said drive connection connected with the frame and the driven axle, and having a portion movable relatively to one of said parts permitting longitudinal movement of the axle relatively to the frame, and cushioning means associated with said casing yieldably resisting longitudinal movement of the said driven axle relatively to the frame.

4. In a motor vehicle, the combination of a frame, axles therefor, power mechanism on the frame, an adjustable drive connection between the power mechanism and one of the axles, said driven axle being connected with the frame for movement longitudinally thereof, and cushioning means yieldably resisting longitudinal movement of the driven axle relatively to the frame, said cushioning means imposing a greater resistance to the longitudinal movement of the driven axle in a direction opposite to the direction of the thrust of the driving connection.

5. In a motor vehicle, the combination of a frame, axles therefor, a motor on the frame, an adjustable drive connection between the motor, and one of the axles, a longitudinally extending casing for said drive connection, the casing being connected with the frame and with the driven axle and having portions movable longitudinally relatively to each other, and cushioning means comprising a cylinder fixedly secured to one of the movable portions of the casing, the other portion of the casing extending within said cylinder, and means within the cylinder yieldably resisting longitudinal movement of the driven axle relatively to the frame.

6. In a motor vehicle, the combination of a frame, axles therefor, a motor on the frame, an adjustable drive connection between the motor and one of the axles, a longitudinally extending casing for said drive connection, the casing being connected with the frame and with the driven axle and having portions movable longitudinally relatively to each other, and cushioning means comprising a cylinder fixedly secured to one of the movable portions of the casing, the other portion of the casing extending within said cylinder, a main coiled compression spring in said cylinder yieldably resisting longitudinal movement of the driven axle equally in both directions against road shocks, and an auxiliary cushioning means within the cylinder acting to impose resistance to the movement of the driven axle in a direction opposite to the direction of the thrust of the drive connection to offset or balance the thrust of the drive connection.

7. In a motor vehicle, the combination of a frame, axles therefor, a motor on the frame, an adjustable drive connection between the motor and one of the axles, a longitudinally extending casing for said drive connection, the casing being connected with the frame and with the driven axle and having portions movable longitudinally relatively to each other, and cushioning means comprising a cylinder fixedly secured to one of the said movable portions of the casing, pistons in the cylinder, spring cushioning means in the cylinder acting to resist movement of the pistons in one direction and to normally maintain the pistons at opposite end portions of the cylinder, and means on the other movable portion of the casing connecting one of the pistons with said portion for movement therewith upon movement between the movable portions of the casing toward one another, and connecting the said movable portion with the other piston upon movement between the movable portion of the casing away from one another.

8. In a motor vehicle, the combination of a frame, axles therefor, a motor on the frame, an adjustable drive connection between the motor and one of the axles, a longitudinally extending casing for said drive connection, the casing being connected with the frame and with the driven axle and having portions movable longitudinally relatively to each other, and cushioning means comprising a cylinder fixedly secured to one of the movable portions of the casing, the other portion of the casing extending within said cylinder, pistons in the cylinder, spring cushioning means in the cylinder acting to resist movement of the pistons in one direction and to normally maintain the pistons at opposite end portions of the cylinder, and means on the other movable portion of the casing connecting one of the pistons with said portion for movement therewith upon movement between said movable portions of the casing toward one another, and connecting the said portion with the other piston upon the movement between the said portions away from one another, said pistons being provided with air ports and check valves permitting the passage of air through the ports of the pistons in one direction.

9. In a motor vehicle, the combination of a frame, axles therefor, a motor on the frame, an adjustable drive connection between the motor and one of the axles, a longitudinally extending casing for said drive connection, the casing being connected with the frame and with the driven axle and having portions movable longitudinally relatively to each other, and cushioning means comprising a cylinder fixedly secured to one of the movable portions of the casing, the other movable portion of the casing extending within said cylinder, pistons in the cylinder, spring cushioning means in the cylinder acting to resist movement of the pistons in one direction and to normally maintain the pistons at the opposite end portions of the cylinder, and means on the other movable portion of the casing connecting one of the pistons with said portion for movement therewith upon movement between said movable portions of the casing toward one another, a second cylinder within the first mentioned cylinder secured at one end to one of said pistons, a piston in the second cylinder fixedly secured upon said movable portion of the casing, spring cushioning means between the piston in the second cylinder and the piston to which the second cylinder is connected, the piston in the second cylinder being adapted to engage with one end portion of the second cylinder and move the piston with which it is connected against the tension of the first mentioned cushioning means.

10. In a motor vehicle, the combination of a frame, axles therefor, a motor on the frame, an adjustable drive connection between the motor and one of the axles, a longitudinally extending casing for said drive connection, the casing being connected with the frame and with the driven axle and having portions movable longitudinally relatively to each other, and cushioning means comprising a cylinder fixedly secured to one of the movable portions of the casing, the other movable portion of the casing extending within said cylinder, pistons in the cylinder, spring cushioning means in the cylinder acting to resist movement of the pistons in one direction and to normally maintain the pistons at opposite end portions of the cylinder, and means on the other movable portion of the casing connecting one of the pistons with said portion for movement therewith upon movement between said movable portions of the casing toward one another, a second cylinder within the first mentioned cylinder secured at one end to one of said pistons, a piston in the second cylinder fixedly secured upon said movable portion of the casing, spring cushioning means between the piston in the second cylinder and the piston to which the second cylinder is connected, the piston in the second cylinder being adapted to engage with one end portion of the second cylinder and move the piston with which it is connected against the tension of the first mentioned spring cushioning means, the piston in the second cylinder being provided with an air port and check valve permitting the passage of air through the port of the piston in one direction.

11. In a motor vehicle, the combination of a frame, axles therefor, a motor on the frame, an adjustable drive connection between the motor and one of the axles, a longitudinally extending casing for said drive connection, the casing being connected with the frame and with the driven axle and having portions movable longitudinally relatively to each other, and cushioning means comprising a cylinder fixedly secured to one of the movable portions of the casing, the other movable portion of the casing extending within said cylinder, pistons in the cylinder, a coiled compression spring within the cylinder acting to resist movement of the pistons in one direction and to normally maintain the pistons at opposite end portions of the cylinder, and means on the other movable portion of the casing connecting one of the pistons with said portion for movement therewith upon movement between said movable portions of the casing toward one another, and connecting the said movable portion of the casing with the other piston upon movement between the said portions away from one another.

12. Shock absorbing mechanism for motor vehicles, comprising an outer cylinder, pistons in the cylinder, spring cushioning means in the cylinder acting to resist movement of the pistons in one direction and to normally maintain the pistons at opposite end portions of the cylinder, a rod movable longitudinally of the cylinder, means on said rod and one of the pistons adapted to connect the rod with said piston upon the movement of the rod in one direction, a second cylinder arranged within the outer cylinder and secured at one end to the other piston, a piston in said second cylinder at one thereof and secured to the said rod, spring cushioning means interposed between the piston in the inner cylinder and the piston to which the cylinder is connected, said piston on the outward movement of the said rod being adapted to engage a part on the inner cylinder and move the piston to which it is connected against the tension of the first mentioned cushioning means.

13. Shock absorbing mechanism for motor vehicles, comprising an outer cylinder, pistons in the cylinder, spring cushioning means in the cylinder acting to resist the movement of the pistons in one direction and to normally maintain the pistons at opposite end portions of the cylinder, a rod movable longitudinally of the cylinder, means on said rod and one of the pistons adapted to connect the rod with said piston upon the movement of the rod in one direction, a second cylinder arranged within the outer cylinder and secured at one end to the other piston, a piston in said second cylinder at one end thereof and secured to the said rod, spring cushioning means interposed between the pistons in the inner cylinder and the piston to which the inner cylinder is connected, said piston on the outward movement of the said rod being adapted to engage a part on the inner cylinder and move the piston to which it is connected against the tension of the first mentioned cushioning means, and lubricant circulating means including a passage leading to the interior of the inner cylinder, a port leading from the inner cylinder to the interior of the outer cylinder and separate passages leading from opposite ends of the outer cylinder to said first mentioned passage, said pistons acting upon their return stroke to force lubricant from the outer cylinder to the said passage.

14. Shock absorbing mechanism for motor vehicles, comprising an outer cylinder, pistons in the cylinder, spring cushioning means in the cylinder acting to resist the movement of the pistons in one direction and to normally maintain the pistons at opposite end portions of the cylinder, a rod movable longitudinally of the cylinder, means on said rod and one of the pistons adapted to connect the rod with said piston upon the movement of the rod in one direction, a second cylinder arranged within the outer cylinder and secured at one end to the other piston, a piston in said cylinder at one end thereof and secured to the said rod, spring cushioning means interposed between the piston in the inner cylinder and the piston to which the cylinder is connected, said piston on the outward movement of the said rod being adapted to engage a part on the inner cylinder and move the piston to which it is connected against the tension of the first mentioned cushioning means, and lubricant circulating means including a passage leading to the interior of the inner cylinder, a port leading from the inner cylinder to the interior of the outer cylinder, separate passages leading from opposite ends of the outer cylinder to said first mentioned passage, and check valves in said passages permitting the flow of lubricant in one direction to the said first mentioned passage, said pistons acting upon their return strokes to force lubricant from the outer cylinder through the last mentioned passages to the first mentioned passage.

15. Shock absorbing mechanism for motor vehicles, comprising a cylinder, pistons in the cylinder, spring cushioning means in the cylinder acting to resist the movement of the pistons in one direction and to normally maintain the pistons at opposite end portions of the cylinder, a rod movable longitudinally of the cylinder, means connecting the rod with one of the pistons upon the movement of the rod in one direction, and with the other piston upon the movement of the rod in the other direction, and lubricant circulating means including a passage leading to the interior of the cylinder, separate passages leading from opposite ends of the cylinder to the first mentioned passage, and check valves in said passages permitting the flow of lubricant in one direction through the passages to the first mentioned passage, said pistons acting upon their return strokes to force lubricant from the outer cylinder through the last mentioned passages to the first mentioned passage.

16. In a motor vehicle, the combination of a frame, axles therefor, power mechanism on the frame, a drive connection between the power mechanism and one of the axles including a longitudinally extending transmission shaft having sections movable longitudinally relatively to each other, a bearing interposed between and slidably engaging each of the said sections, and cushioning means yieldably resisting longitudinal movement of said sections of the transmission shaft relatively to each other.

17. In a motor vehicle, the combination of a frame, axles therefor, power mechanism on the frame, a drive connection between the power mechanism and one of the axles including a longitudinally extending transmission shaft having sections movable longitudinally relatively to each other, a bearing slidably engaging and movable relatively to each of said sections, a gear connection between the bearing and said shaft sections acting to maintain the bearing in operative position relative to the shaft sections, and cushioning means yieldably resisting longitudinal movement of the shaft sections relatively to each other.

18. In a motor vehicle, the combination of a frame, axles therefor, power mechanism on the frame, a drive connection between the power mechanism and one of the axles including a longitudinally extending transmission shaft having sections movable longitudinally relatively to each other, one of said shaft sections having a tubular portion and the other shaft section fitting within said tubular portion, a tubular anti-friction bearing slidably fitting within the tubular portion of one shaft section, and slidably fitting over the other shaft section, and cushioning means yieldably resisting longitudinal movement of said sections of the transmission shaft relatively to each other.

19. In a motor vehicle, the combination of a frame, axles therefor, power mechanism on the frame, a drive connection between the power mechanism and one of the axles including a longitudinally extending transmission shaft having sections movable longitudinally relatively to each other, one of said shaft sections having a tubular portion and the other shaft section fitting within said tubular portion, a tubular anti-friction bearing slidably fitting within the tubular portion of one shaft section, and slidably fitting over the other shaft section, means for maintaining the tubular bearing in operative position respecting the shaft sections, said means including a rack on each shaft section and a pinion on the bearing meshing with the racks of both sections, and cushioning means yieldably resisting longitudinal movement of said shaft sections relatively to each other.

20. In a motor vehicle, the combination of a frame, axles therefor, power mechanism on the frame, a drive connection between the power mechanism and one of the axles including a longitudinally extending transmission shaft having sections movable longitudinally relatively to each other, one of said shaft sections being provided with a longitudinally extending bore having angularly related walls, the other shaft section having a portion shaped in cross section to correspond to the shape of the bore of the other section and fitting within said bore, a tubular bearing of general shape in cross section corresponding with the shape of the bore and said portion of the other shaft section, said tubular bearing fitting within the bore for longitudinal sliding movement therein and fitting around the portion of the other shaft section to slide longitudinally thereon, and cushioning means yieldably resisting longitudinal movement of said sections of the transmission shaft relatively to each other.

21. In a motor vehicle, the combination of a frame, axles therefor, power mechanism on the frame, a drive connection between the power mechanism and one of the axles including a longitudinally extending transmission shaft having sections movable longitudinally relatively to each other, one of said shaft sections being provided with a tubular portion having angularly related walls, the other shaft section having a portion correspondingly shaped in cross section to fit within the tubular portion of the other section, a tubular bearing arranged to slide longitudinally within the tubular portion of one shaft section, and to fit around the portion of the other shaft section for longitudinal movement respecting the same, said tubular bearing comprising a frame of general shape in cross section corresponding to the tubular portion of one of the shaft sections, and anti-friction rollers journaled in the walls of the frame and projecting from opposite sides thereof, and cushioning means yieldably resisting longitudinal movement of the said shaft sections relatively to each other.

22. In a motor vehicle, the combination of a frame, axles therefor, power mechanism on the frame, a drive connection between the power mechanism and one of the axles including a longitudinally extending transmission shaft having sections movable longitudinally relatively to each other, one of said shaft sections being provided with a tubular portion having angularly related walls, the other shaft section having a portion correspondingly shaped in cross section to fit within the tubular portion of the other section, a tubular bearing arranged to slide longitudinally within the tubular portion of one shaft section, and to fit around the portion of the other shaft section for longitudinal movement respecting the same, said tubular bearing comprising a frame of general shape in cross section corresponding to the tubular portion of one of the shaft sections, anti-friction rollers journaled in the walls of the frame and projecting from opposite sides thereof, means for maintaining the tubular bearing in operative relation with the shaft sections, said means including longitudinally extending racks on the shaft sections, an arm extending from the tubular bearing, a pinion journaled on the said arm and meshing with the racks of both of said bearing sections, and cushioning means yieldably resisting longitudinal movement of said shaft sections relatively to each other.

23. In a motor vehicle, the combination of a frame, axles therefor, power mechanism on the frame, a drive connection between the power mechanism and one of the axles including a longitudinally extending transmission shaft having sections movable longitudinally relatively to each other, one of said sections being provided with a longitudinally extending bore, the other shaft section fitting within the said bore, a transmission shaft housing having telescoping sections, cushioning means associated with the telescoping sections of the transmission shaft housing yieldably resisting longitudinal movement of the sections relatively to each other, said cushioning means including a cylinder on one end of one of the housing sections, the other housing section being arranged to slide within said cylinder, spring cushioning means within the cylinder and lubricant circulating means including a passage extending from the interior of one of the housing sections to the interior of said bore of one of the shaft sections, and a conduit leading from the interior of the said cylinder to the first mentioned passage.

24. In a motor vehicle, the combination of a frame, axles therefor, power mechanism on the frame, a drive connection between the power mechanism and one of the sections including a longitudinally extending transmission shaft having sections in sliding telescoping relation, a casing for the transmission shaft, said casing having partition walls therein at separated points provided with openings through which the telescoping portions of the transmission shaft extend, said partition walls forming with the casing a chamber for lubricant about the telescoping shaft section.

25. In a motor vehicle, the combination of a frame, axles therefor, power mechanism on the frame, a drive connection between the power mechanism and one of the axles including a longitudinally extending transmission shaft having sections in sliding telescoping relation, a housing for the transmission shaft, the housing having telescoping sections, each housing section having a bearing located interiorly thereof for one of the shaft sections.

26. In a motor vehicle, the combination of a frame, power mechanism on the frame, a drive connection between the power mechanism and one of the axles including a longitudinally extending transmission shaft having sections in sliding telescoping relation, a housing for the transmission shaft, the housing having telescoping sections, each housing section having a bearing located interiorly thereof for one of the shaft sections, and a bearing between one of the shaft sections at its inner end and the housing, said last mentioned bearing being arranged intermediate the first mentioned bearings.

27. Shock absorbing mechanism, comprising a cylinder, pistons in the cylinder, the pistons being provided with air ports and check valves permitting passage of air through the ports of the pistons in one direction, spring cushioning means in the cylinder acting to resist movement of the pistons in one direction, and to normally maintain the pistons at opposite end portions of the cylinder, and adjustable means providing for escape of the air from behind the pistons, a rod movable longitudinally of the cylinder, and means connecting the rod with one of the pistons upon movement of the rod in one direction and with the other piston upon movement of the rod in the other direction.

28. Shock absorbing mechanism comprising a cylinder, pistons in the cylinder, said pistons being provided with air ports and check valves permitting the passage of air through the ports of the pistons in one direction, spring cushioning means in the cylinder acting to resist the movement of the pistons in one direction and to normally maintain the pistons at opposite end portions of the cylinder, a rod movable longitudinally of the cylinder, and means connecting the rod with one of the pistons upon the movement of the rod in one direction and with the other piston upon the movement of the rod in the other direction.

29. Shock absorbing mechanism comprising a cylinder, pistons in the cylinder, spring cushioning means acting to resist the movement of the pistons in one direction and to normally maintain the same at opposite end portions of the cylinder, parts on the pistons, a rod movable longitudinally of the cylinder and provided with abutments adapted to coöperate with the said parts on the pistons to couple the rod with one of the pistons upon the movement of the rod in one direction and with the other piston upon the movement of the rod in the opposite direction, each of said pistons being provided with an air port and a check valve permitting the passage of air through the port in the piston in one direction on the forward movement of the piston providing for the pneumatic cushioning of the pistons upon their return strokes.

30. Shock absorbing mechanism comprising a cylinder, pistons in the cylinder, spring cushioning means in the cylinder between the pistons acting to resist the movement of the pistons in one direction, one of said pistons having a tubular piston rod extending outside of the cylinder at one end thereof, a longitudinally movable rod slidably fitting within said tubular piston rod, a piston rod connected with the other piston and slidably engaging said longitudinally movable rod, an abutment member on said last mentioned piston rod, said longitudinally movable rod being provided with an abutment member adapted to engage the outer end of the tubular piston rod to connect its piston with the longitudinally movable rod upon the movement of the rod in one direction, said longitudinally movable rod also having an abutment member adapted to engage the abutment member on the other piston rod upon the movement of the longitudinally movable rod in the opposite direction to couple the other piston with the rod.

31. Shock absorbing mechanism, including a cylinder, a piston in the cylinder, cushioning means in the cylinder acting to resist movement of the piston in one direction, a piston rod connected with the piston, said piston being provided with a port and a check valve permitting the passage of fluid through said port in one direction, and lubricant circulating means including a passage leading from one end of the cylinder to the interior of the cylinder and a check valve in the passage permitting the low of fluid through said passage in one direction, said piston acting to force lubricant from one end of the cylinder through said passage.

In testimony whereof I hereunto affix my signature in the presence of two witnesses.

STEPHEN LEONARD CHAUNCEY COLEMAN.

Witnesses:
 ARTHUR J. SIMPSON,
 J. N. TURRENTINE.